United States Patent
Emoto et al.

(10) Patent No.: US 11,835,247 B2
(45) Date of Patent: Dec. 5, 2023

(54) AIR CONDITIONING CONTROL DEVICE AND AIR CONDITIONING APPARATUS

(71) Applicant: DAIKIN INDUSTRIES, LTD., Osaka (JP)

(72) Inventors: Shiori Emoto, Osaka (JP); Atsushi Nishino, Osaka (JP); Satoshi Hashimoto, Osaka (JP); Shouta Hori, Osaka (JP); Junya Nakase, Osaka (JP); Toshiyuki Maeda, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 17/274,316

(22) PCT Filed: Sep. 3, 2019

(86) PCT No.: PCT/JP2019/034647
§ 371 (c)(1),
(2) Date: Mar. 8, 2021

(87) PCT Pub. No.: WO2020/054519
PCT Pub. Date: Mar. 19, 2020

(65) Prior Publication Data
US 2021/0341166 A1   Nov. 4, 2021

(30) Foreign Application Priority Data
Sep. 10, 2018   (JP) ................. 2018-168638

(51) Int. Cl.
| | | |
|---|---|---|
| *F24F 120/00* | (2018.01) | |
| *F24F 11/06* | (2006.01) | |
| *F24F 11/61* | (2018.01) | |
| *F24F 110/20* | (2018.01) | |
| *F24F 120/14* | (2018.01) | |
| *F24F 110/10* | (2018.01) | |

(52) U.S. Cl.
CPC .............. *F24F 11/06* (2013.01); *F24F 11/61* (2018.01); *F24F 2110/10* (2018.01);
(Continued)

(58) Field of Classification Search
CPC ........ F24F 11/64; F24F 11/61; F24F 2110/10; F24F 2110/20; F24F 2120/00;
(Continued)

(56) References Cited

U.S. PATENT DOCUMENTS 5,674,007 A * 10/1997 Bu .................. G01W 1/17
                                                374/45
5,762,265 A *  6/1998 Kitamura .......... F24F 11/30
                                                236/94

(Continued)

FOREIGN PATENT DOCUMENTS

| JP | 10-259943 A | 9/1998 |
|---|---|---|
| JP | 2001-4189 A | 1/2001 |

(Continued)

OTHER PUBLICATIONS

Kim et al. (Hakpyeong Kim, A psychophysiological effect of indoor thermal condition on college students' learning performance through EEG measurement, a Department of Architecture and Architectural Engineering, Yonsei University, Seoul, 03722, Republic of Korea, Aug. 2020) (Year: 2020).*

(Continued)

*Primary Examiner* — Michael W Choi
(74) *Attorney, Agent, or Firm* — Global IP Counselors, LLP

(57) ABSTRACT

An air conditioning control device controls an air conditioning apparatus capable of changing an air environment of a target space. The air conditioning control device includes a first information grasping unit and a control unit. The first information grasping unit grasps a predetermined comfort-related value relating to comfort of a subject. The control unit controls the air conditioning apparatus so as to satisfy a predetermined discomfort condition based on the comfort-related value grasped by the first information grasping unit.

(Continued)

An air conditioning apparatus includes the air conditioning control device.

7 Claims, 9 Drawing Sheets

(52) U.S. Cl.
CPC ....... *F24F 2110/20* (2018.01); *F24F 2120/00* (2018.01); *F24F 2120/14* (2018.01); *G05B 2219/2614* (2013.01)

(58) Field of Classification Search
CPC .... F24F 2120/14; F24F 2120/20; F24F 11/30; F24F 11/62; F24F 11/65; F24F 11/80; F24F 11/89; G05B 2219/2614
See application file for complete search history.

(56) References Cited

U.S. PATENT DOCUMENTS

| 2011/0205371 | A1* | 8/2011 | Nagata | G06T 7/254 |
| | | | | 348/207.1 |
| 2016/0061472 | A1* | 3/2016 | Lee | F24F 11/30 |
| | | | | 700/276 |
| 2017/0159953 | A1* | 6/2017 | Kim | F24F 11/79 |
| 2018/0072310 | A1* | 3/2018 | Fung | B60W 50/14 |
| 2018/0321700 | A1* | 11/2018 | Kwak | G06F 3/015 |
| 2019/0212026 | A1* | 7/2019 | Kim | F24F 11/65 |
| 2019/0268999 | A1* | 8/2019 | Oobayashi | F24F 11/61 |
| 2019/0299744 | A1 | 10/2019 | Kusukame et al. | |

FOREIGN PATENT DOCUMENTS

| JP | 2003-329285 A | 11/2003 |
| JP | 2013-100962 A | 5/2013 |
| WO | 2017/134803 A1 | 8/2017 |
| WO | 2018/105331 A1 | 6/2018 |

OTHER PUBLICATIONS

International Search Report of corresponding PCT Application No. PCT/JP2019/034647 dated Oct. 8, 2019.
International Preliminary Report of corresponding PCT Application No. PCT/JP2019/034647 dated Mar. 25, 2021.
European Search Report of corresponding EP Application No. 19 860 560.2 dated Apr. 21, 2022.

* cited by examiner

AIR CONDITIONING CONTROL DEVICE AND AIR CONDITIONING APPARATUS

CROSS-REFERENCE TO RELATED APPLICATIONS

This U.S. National stage application claims priority under 35 U.S.C. § 119(a) to Japanese Patent Application No. 2018-168638, filed in Japan on Sep. 10, 2018, the entire contents of which are hereby incorporated herein by reference.

BACKGROUND

Field of the Invention

The technical field is a field related to air conditioning control devices and air conditioning apparatuses.

Background Information

Hitherto, it has been demanded to improve an environment in a space where a worker is present to increase the work efficiency of the worker.

For example, a control device for an air-conditioner described in Japanese Unexamined Patent Application Publication No. H10-259943 has been proposed in which the arousal level of a subject is grasped and an air conditioning operation for changing from a low-arousal-level state, such as a drowsy state, to a high-arousal-level state is executed to maintain high work efficiency of a person in a room.

SUMMARY

In the control device for the air conditioner described in Japanese Unexamined Patent Application Publication No. H10-259943 described above, it is only disclosed that the set temperature, the air flow rate, and the air flow direction are changed to such an extent as not to provide discomfort to the subject to increase the arousal level of the subject. However, a new method for increasing the arousal level is desired.

In view of the issues described above, it is an object of the present disclosure to provide an air conditioning control device and an air conditioning apparatus capable of bringing a subject to arousal.

An air conditioning control device according to a first aspect is an air conditioning control device for controlling air conditioning means capable of changing an air environment of a target space, including a first information grasping unit and a control unit. The first information grasping unit is configured to grasp a predetermined comfort-related value relating to comfort of a subject. The control unit controls the air conditioning means so as to satisfy a predetermined discomfort condition on the basis of the comfort-related value grasped by the first information grasping unit.

The air conditioning means is not limited and may be configured to, for example, change at least one of the temperature, the humidity, or the wind velocity in the target space.

The comfort-related value is not limited and includes a value indicating human comfort, an environmental physical quantity that affects human comfort, a physical quantity correlated with the environmental physical quantity, and the like. The comfort-related value may be, for example, the value of the PMV (thermal environment evaluation index) of the subject, the discomfort index of the subject, the degree of deviation of the temperature of the target space from the set temperature when the air conditioning means is controlled using the set temperature as a target value, the temperature, the humidity, or the radiation in a space where the subject is present, the wind velocity at a location near the subject, or a value obtained by any one or a combination thereof.

The phrase "controls . . . so as to satisfy a predetermined discomfort condition on the basis of the comfort-related value" is not limited and may be used to indicate, for example, performing control so that the comfort-related value falls within a predetermined range in which the subject is predicted to feel more uncomfortable than the current value, or performing control so that the comfort-related value is shifted in a direction in which the subject feels more uncomfortable than the current value. For example, when the comfort-related value is the discomfort index of the subject, control may be performed so as to increase the level of discomfort on the discomfort index. When the comfort-related value is the PMV of the subject, control may be performed so as to increase the absolute value of the PMV. When the comfort-related value is the temperature of a space where the subject is present, control may be performed so as to satisfy a predetermined discomfort temperature condition.

In this air conditioning control device, it is possible to increase the arousal level of the subject by using a novel method of controlling the air conditioning means so as to satisfy a predetermined discomfort condition on the basis of the comfort-related value of the subject.

An air conditioning control device according to a second aspect is the air conditioning control device according to the first aspect, in which the comfort-related value is grasped from at least a temperature and a humidity in the target space.

In this air conditioning control device, it is possible to more reliably worsen the comfort of the subject.

An air conditioning control device according to a third aspect is the air conditioning control device according to the second aspect, in which the comfort-related value is a PMV (thermal environment evaluation index). The control unit controls the air conditioning means to increase an absolute value of the PMV of the subject grasped by the first information grasping unit so that the absolute value of the PMV of the subject is larger than a current value.

In this air conditioning control device, it is possible to further reliably worsen the comfort of the subject.

An air conditioning control device according to a fourth aspect is the air conditioning control device according to the third aspect, in which the control unit controls the air conditioning means to increase the absolute value of the PMV of the subject grasped by the first information grasping unit so that the absolute value of the PMV of the subject is larger than the current value by 1 or more.

In this air conditioning control device, it is possible to more reliably increase the arousal level by sufficiently worsening the comfort of the subject.

An air conditioning control device according to a fifth aspect is the air conditioning control device according to the fourth aspect, in which the control unit controls the air conditioning means to continue control for 4 minutes or more, the control being control for increasing the absolute value of the PMV of the subject grasped by the first information grasping unit so that the absolute value of the PMV of the subject is larger than the current value by 2 or more.

In this air conditioning control device, it is possible to significantly increase the arousal level of the subject.

An air conditioning control device according to a sixth aspect is the air conditioning control device according to any one of the first to fourth aspects, in which the control unit continues control for at least 1 minute or more, the control being based on the comfort-related value grasped by the first information grasping unit.

In this air conditioning control device, it is possible to more reliably increase the arousal level by worsening the comfort of the subject for a sufficient period of time.

An air conditioning control device according to a seventh aspect is the air conditioning control device according to any one of the first to sixth aspects, in which the control unit sets a duration of control to 30 minutes or less, the control being based on the comfort-related value grasped by the first information grasping unit.

In this air conditioning control device, it is possible to prevent a reduction in the effect of improving the arousal level due to an excessively long period of time during which the subject is made uncomfortable.

An air conditioning control device according to an eighth aspect is the air conditioning control device according to any one of the first to seventh aspects, in which the control unit is capable of executing normal control for controlling the air conditioning means so that a set temperature condition of the target space is satisfied. The control unit starts control in a case where a predetermined start condition is satisfied while the normal control is being executed, the control being based on the comfort-related value grasped by the first information grasping unit.

In this air conditioning control device, the control of worsening the comfort of the subject is not performed at all times, but can be performed only when a predetermined start condition is satisfied while the normal control is being executed. It is possible to prevent the control of worsening the comfort of the subject from being unnecessarily performed.

An air conditioning control device according to a ninth aspect is the air conditioning control device according to the eighth aspect, in which the predetermined start condition is a condition regarding a predetermined time of day.

In this air conditioning control device, the control of worsening the comfort of the subject can be started only when a predetermined time of day is reached while the normal control is being executed.

An air conditioning control device according to a tenth aspect is the air conditioning control device according to any one of the first to ninth aspects, further including a second information control unit. The second information control unit is configured to grasp physical and mental state information or biological state information of the subject. The control unit controls the air conditioning means to perform control based on the comfort-related value grasped by the first information grasping unit to increase an arousal level of the subject grasped by the second information grasping unit.

The arousal level is not limited and may be determined based on, for example, the heartbeat state of the user, the facial expression of the user, the temperature of the skin of the user, the number of breaths that the user takes per unit time, the brain wave of the user, or a combination thereof.

In this air conditioning control device, it is possible to more reliably increase the arousal level of the subject by making the subject uncomfortable.

An air conditioning control device according to an eleventh aspect is the air conditioning control device according to the eighth aspect, further including a second information control unit. The second information control unit is configured to grasp physical and mental state information or biological state information of the subject. The predetermined start condition is a condition that an arousal level of the subject grasped by the second information grasping unit is equal to or less than a predetermined value.

In this air conditioning control device, providing discomfort to the subject when a reduction in the arousal level of the subject is confirmed makes it easy to keep the arousal level of the subject in a favorable state.

An air conditioning apparatus according to a twelfth aspect includes the air conditioning control device according to any one of the first to eleventh aspects.

This air conditioning apparatus can bring the subject to arousal.

DETAILED DESCRIPTION OF EMBODIMENT(S)

Hereinafter, an air conditioning control device according to an embodiment and an air conditioning apparatus provided with the air conditioning control device will be described with reference to the drawings. It should be noted that the following embodiment is a specific example of the present disclosure and is not intended to limit the technical scope of the content of the present disclosure, but can be modified, as appropriate, without departing from the spirit of the present disclosure.

(1) Air Conditioning Apparatus 100

Figure 1:
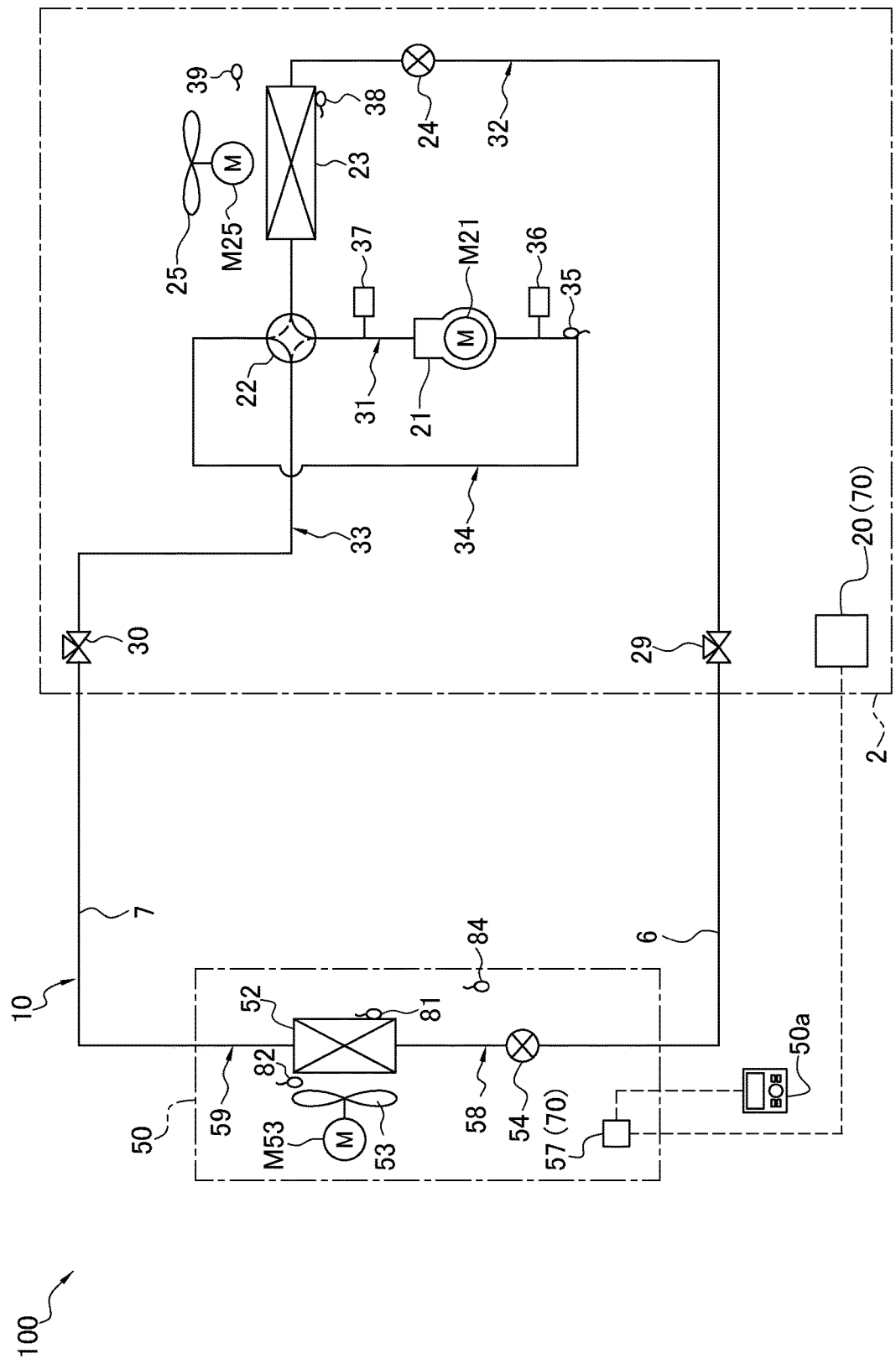
FIG. 1 is an overall configuration diagram of an air conditioning apparatus.

FIG. 1 is a schematic configuration diagram of an air conditioning apparatus 100. The air conditioning apparatus 100 is an apparatus that performs air conditioning of a target space by performing a vapor compression refrigeration cycle.

The air conditioning apparatus 100 mainly includes an outdoor unit 2, an indoor unit 50, a liquid-refrigerant connection pipe 6 and a gas-refrigerant connection pipe 7 that connect the outdoor unit 2 and the indoor unit 50 to each other, an plurality of remote controls 50a, each of which serves as an input device and an output device, and a controller 70 that controls the operation of the air conditioning apparatus 100.

In the air conditioning apparatus 100, a refrigeration cycle is performed such that refrigerant sealed in a refrigerant circuit 10 is compressed, cooled or condensed, decompressed, heated or evaporated, and then compressed again.

(1-1) Outdoor Unit 2

The outdoor unit 2 is connected to the indoor unit 50 through the liquid-refrigerant connection pipe 6 and the gas-refrigerant connection pipe 7 and forms a portion of the refrigerant circuit 10. The outdoor unit 2 mainly includes a compressor 21, a four-way switching valve 22, an outdoor heat exchanger 23, an outdoor expansion valve 24, an outdoor fan 25, a liquid-side shutoff valve 29, and a gas-side shutoff valve 30.

The outdoor unit 2 further includes pipes constituting the refrigerant circuit 10, namely, a discharge pipe 31, a suction pipe 34, an outdoor gas-side pipe 33, and an outdoor liquid-side pipe 32. The discharge pipe 31 connects the discharge side of the compressor 21 and a first connection port of the four-way switching valve 22 to each other. The suction pipe 34 connects the suction side of the compressor 21 and a second connection port of the four-way switching valve 22 to each other. The outdoor gas-side pipe 33 connects a third connection port of the four-way switching valve 22 and the gas-side shutoff valve 30 to each other. The outdoor liquid-side pipe 32 extends from a fourth connection port of the four-way switching valve 22 to the liquid-side shutoff valve 29 through the outdoor heat exchanger 23 and the outdoor expansion valve 24.

The compressor 21 is a device that compresses low-pressure refrigerant in the refrigeration cycle to high-pressure refrigerant. The compressor 21 is implemented here as a hermetically sealed compressor in which a positive displacement compression element (not illustrated), such as a rotary or a scroll compression element, is driven to rotate by a compressor motor M21. The compressor motor M21 is used to change volume and has an operating frequency that can be controlled by an inverter.

The connection state of the four-way switching valve 22 can be switched to switch the four-way switching valve 22 between a cooling-operation connection state in which the suction side of the compressor 21 and the gas-side shutoff valve 30 are connected to each other while the discharge side of the compressor 21 and the outdoor heat exchanger 23 are connected to each other and a heating-operation connection state in which the suction side of the compressor 21 and the outdoor heat exchanger 23 are connected to each other while the discharge side of the compressor 21 and the gas-side shutoff valve 30 are connected to each other.

The outdoor heat exchanger 23 is a heat exchanger that functions as a radiator for high-pressure refrigerant in the refrigeration cycle during a cooling operation and that functions as an evaporator for low-pressure refrigerant in the refrigeration cycle during a heating operation.

The outdoor fan 25 generates an air flow for sucking outdoor air into the outdoor unit 2, allowing the air to exchange heat with the refrigerant in the outdoor heat exchanger 23, and then discharging the air to the outside. The outdoor fan 25 is driven to rotate by an outdoor fan motor M25.

The outdoor expansion valve 24 is an electric expansion valve whose valve opening degree is controllable, and is disposed midway in the outdoor liquid-side pipe 32 between the outdoor heat exchanger 23 and the liquid-side shutoff valve 29.

The liquid-side shutoff valve 29 is a manual valve arranged in a connecting portion between the outdoor liquid-side pipe 32 and the liquid-refrigerant connection pipe 6.

The gas-side shutoff valve 30 is a manual valve arranged in a connecting portion between the outdoor gas-side pipe 33 and the gas-refrigerant connection pipe 7.

The outdoor unit 2 has various sensors arranged therein. Specifically, the outdoor unit 2 has arranged therein, near the compressor 21, a suction temperature sensor 35 that detects the temperature of refrigerant on the suction side of the compressor 21, a suction pressure sensor 36 that detects a suction pressure, which is the pressure of refrigerant on the suction side of the compressor 21, and a discharge pressure sensor 37 that detects a discharge pressure, which is the pressure of refrigerant on the discharge side of the compressor 21. The outdoor heat exchanger 23 is also provided with an outdoor heat-exchange temperature sensor 38 that detects the temperature of refrigerant flowing through the outdoor heat exchanger 23. Further, an outside air temperature sensor 39 that detects the temperature of outdoor air sucked into the outdoor unit 2 is arranged near the outdoor heat exchanger 23 or the outdoor fan 25.

The outdoor unit 2 includes an outdoor unit control unit 20 that controls the operation of the components of the outdoor unit 2. The outdoor unit control unit 20 has a microcomputer including a CPU, a memory, and the like. The outdoor unit control unit 20 is connected to an indoor unit control unit 57 of each indoor unit 50 via a communication line, and transmits and receives control signals and the like. Further, the outdoor unit control unit 20 is electrically connected to the suction temperature sensor 35, the suction pressure sensor 36, the discharge pressure sensor 37, the outdoor heat-exchange temperature sensor 38, and the outside air temperature sensor 39, and receives a signal from each sensor.

(1-2) Indoor Unit 50

The indoor unit 50 is mounted on the wall surface, the ceiling, or the like of a room that is the target space. The indoor unit 50 is connected to the outdoor unit 2 through the liquid-refrigerant connection pipe 6 and the gas-refrigerant connection pipe 7 and forms a portion of the refrigerant circuit 10.

The indoor unit 50 includes an indoor expansion valve 54, an indoor heat exchanger 52, and an indoor fan 53.

The indoor unit 50 further includes an indoor liquid refrigerant pipe 58 that connects the liquid-side end of the indoor heat exchanger 52 and the liquid-refrigerant connection pipe 6 to each other, and an indoor gas refrigerant pipe 59 that connects the gas-side end of the indoor heat exchanger 52 and the gas-refrigerant connection pipe 7 to each other.

The indoor expansion valve 54 is an electric expansion valve whose valve opening degree is controllable, and is disposed midway in the indoor liquid refrigerant pipe 58.

The indoor heat exchanger 52 is a heat exchanger that functions as an evaporator for low-pressure refrigerant in the refrigeration cycle during a cooling operation and that functions as a radiator for high-pressure refrigerant in the refrigeration cycle during a heating operation.

The indoor fan 53 generates an air flow for sucking indoor air into the indoor unit 50, allowing the air to exchange heat with the refrigerant in the indoor heat exchanger 52, and then discharging the air to the outside. The indoor fan 53 is driven to rotate by an indoor fan motor M53.

The indoor unit 50 has various sensors arranged therein. Specifically, the indoor unit 50 has arranged therein an indoor heat-exchange temperature sensor 81 that detects the temperature of refrigerant flowing through the indoor heat exchanger 52, an indoor air temperature sensor 82 that detects the air temperature in a space where the indoor unit 50 is installed, an indoor humidity sensor 83 that detects the humidity of air in the space where the indoor unit 50 is installed, and a radiation temperature sensor 84 that contactlessly detects the radiation temperature at the position of a user in the space where the indoor unit 50 is installed.

The indoor unit 50 further includes the indoor unit control unit 57 that controls the operation of the components of the indoor unit 50. The indoor unit control unit 57 has a microcomputer including a CPU, a memory, and the like. The indoor unit control unit 57 is connected to the outdoor unit control unit 20 via a communication line, and transmits and receives control signals and the like.

The indoor unit control unit 57 is electrically connected to the indoor heat-exchange temperature sensor 81, the indoor air temperature sensor 82, the indoor humidity sensor 83, and the radiation temperature sensor 84, and receives a signal from each sensor.

(1-3) Remote Control 50a

The remote control 50a is an input device used by the user of the indoor unit 50 to input various instructions to switch the operating state of the air conditioning apparatus 100. The remote control 50a also functions as an output device for notifying the user of the operating state of the air conditioning apparatus 100 or providing a predetermined notification. The remote control 50a and the indoor unit control unit 57 are connected to each other via a communication line and transmit and receive signals to and from each other.

Further, the remote control 50a is provided with a clothing amount acceptance unit 51a that accepts information on the amount of clothing that the user wears, and a metabolic information grasping unit 51b for grasping the metabolic rate of the user. The clothing amount acceptance unit 51a accepts information on the amount of clothing that the user wears from the user via an input unit such as an operation button or a touch panel (not illustrated) provided in the remote control 50a. The amount of clothing is not limited and may be grasped by, for example, accepting selection of a clothing pattern determined by the user to be closest to their own clothing pattern among a plurality of types of clothing patterns for which the respective amounts of clothing are determined in advance. The metabolic information grasping unit 51b grasps a position information history of a personal mobile terminal 56 such as a mobile phone possessed by the user by using a GPS system or the like via a communication network such as the Internet 55 to grasp the metabolic rate of the user from the distance traveled in the most recent predetermined unit time (for example, the most recent 10 minutes) in accordance with a predetermined relational expression.

(2) Details of Controller 70

In the air conditioning apparatus 100, the outdoor unit control unit 20 and the indoor unit control unit 57, which are connected to each other via a communication line, form the controller 70 serving as an air conditioning control device that controls the operation of the air conditioning apparatus 100.

Figure 2:
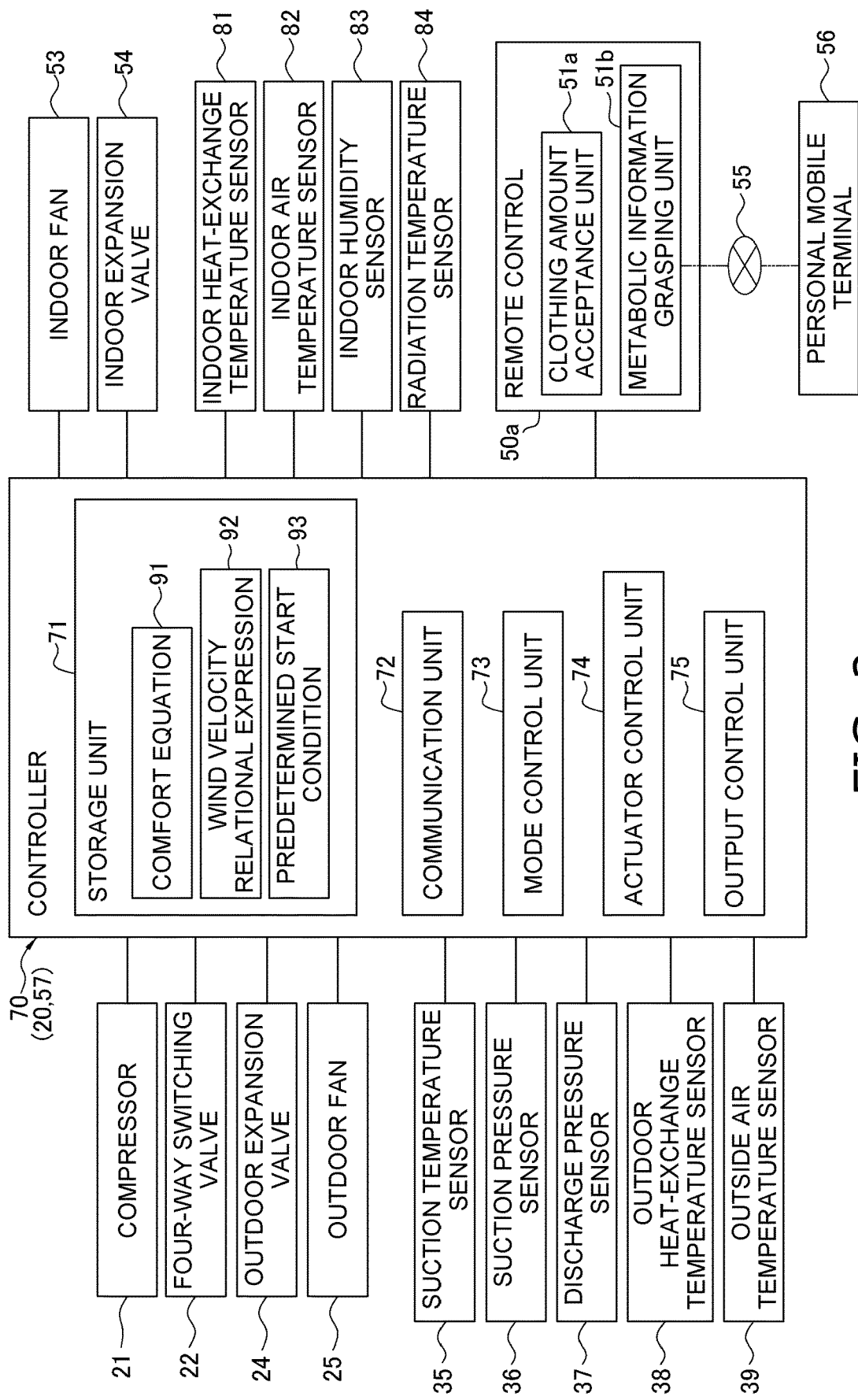
FIG. 2 is a block configuration diagram of the air conditioning apparatus.

FIG. 2 is a block diagram schematically illustrating the general configuration of the controller 70 and components connected to the controller 70.

The controller 70 has a plurality of control modes and controls the operation of the air conditioning apparatus 100 in accordance with the control mode. For example, the controller 70 has, as control modes, a normal operation mode that is executed in normal conditions, and an arousal control mode for increasing the arousal level of the user.

The controller 70 is electrically connected to the actuators included in the outdoor unit 2 (specifically, the compressor 21 (the compressor motor M21), the outdoor expansion valve 24, and the outdoor fan 25 (the outdoor fan motor M25)), and the various sensors included in the outdoor unit 2 (such as the suction temperature sensor 35, the suction pressure sensor 36, the discharge pressure sensor 37, the outdoor heat-exchange temperature sensor 38, and the outside air temperature sensor 39). The controller 70 is also electrically connected to the actuators included in the indoor unit 50 (specifically, the indoor fan 53 (the indoor fan motor M53) and the indoor expansion valve 54). The controller 70 is also electrically connected to the indoor heat-exchange temperature sensor 81, the indoor air temperature sensor 82, the indoor humidity sensor 83, the radiation temperature sensor 84, and the remote control 50a.

The controller 70 mainly includes a storage unit 71, a communication unit 72, a mode control unit 73, an actuator control unit 74, and an output control unit 75. These components of the controller 70 are implemented by the integrated functioning of the components included in the outdoor unit control unit 20 and/or the indoor unit control unit 57.

(2-1) Storage Unit 71

The storage unit 71 is constituted by, for example, a ROM, a RAM, a flash memory, and the like and includes a volatile storage area and a non-volatile storage area. The storage unit 71 stores a control program that defines processes performed by the components of the controller 70. The storage unit 71 further stores predetermined information (for example, a value detected by each sensor, a command input to the remote control 50a, etc.) in a predetermined storage area, as appropriate, by using the components of the controller 70.

More specifically, the storage unit 71 stores data of a predetermined comfort equation 91, data of a predetermined wind velocity relational expression 92, data of a predetermined start condition 93, and the like.

Specifically, the data of the comfort equation 91 represents an equation for calculating the value of the thermal environment evaluation index PMV of the user from the values of six elements, namely, the indoor air temperature, the radiation temperature at a location near the user, the relative humidity in the room, the wind velocity at the location near the user, the amount of clothing that the user wears, and the metabolic rate of the user, and is determined in advance. The thermal environment evaluation index PMV is not limited and may be a numerical value based on a seven-grade assessment scale according to ISO 7730 (1994) or ISO 7730 (2005).

The data of the wind velocity relational expression 92 represents a relational expression for calculating the wind velocity at a location near the position of the user in the room and corresponding to the driving state of the indoor fan 53, and the value of the wind velocity is obtained by specifying an input value to the indoor fan motor M53 of the indoor fan 53.

The data of the predetermined start condition 93 is data indicating a condition for starting the arousal control mode from a state in which the air conditioning apparatus 100 is executing the normal control mode for the cooling operation, the dehumidifying operation, the heating operation, or the like. The data of the predetermined start condition 93 is not limited and may be, for example, a condition that a specific time period is reached or a condition that a predetermined time interval has elapsed since the last time the arousal control mode was terminated.

(2-2) Communication Unit 72

The communication unit 72 is a functional unit serving as a communication interface for transmitting and receiving signals to and from devices connected to the controller 70. The communication unit 72 transmits a predetermined signal to a designated actuator in response to receipt of a request from the actuator control unit 74. Further, the communication unit 72 receives signals output from the sensors 35 to 39 and 81 to 84 and the remote control 50a and stores the signals in a predetermined storage area of the storage unit 71.

(2-3) Mode Control Unit 73

The mode control unit 73 is a functional unit that performs processing such as switching between the control modes. If the predetermined start condition 93 is not satisfied for any indoor unit 50, the mode control unit 73 sets the control mode to the normal operation mode.

On the other hand, if the predetermined start condition 93 is satisfied for any one of the indoor unit 50, the mode control unit 73 switches the control mode to the arousal control mode.

(2-4) Actuator Control Unit 74

The actuator control unit 74 controls the operation of the actuators (such as the compressor 21) included in the air conditioning apparatus 100 along with the control program in accordance with the situation.

For example, in the normal operation mode, the actuator control unit 74 controls the number of revolutions of the compressor 21, the numbers of revolutions of the outdoor fan 25 and the indoor fan 53, the valve opening degree of the outdoor expansion valve 24, the valve opening degree of the indoor expansion valve 54, and the like in real time in accordance with a set temperature, values detected by various sensors, and the like.

In the arousal control mode, the actuator control unit 74 controls the operation of the actuators so that a predetermined operation can be performed. Specifically, the actuator control unit 74 controls the number of revolutions of the compressor 21, the numbers of revolutions of the outdoor fan 25 and the indoor fan 53, the valve opening degree of the outdoor expansion valve 24, the valve opening degree of the indoor expansion valve 54, and the like in real time so that the PMV (thermal environment evaluation index) of the user becomes worse than the current value.

(2-5) Output Control Unit 75

The output control unit 75 is a functional unit that controls the operation of the remote control 50a serving as a display device.

The output control unit 75 causes the remote control 50a to output predetermined information so that information related to the operating state or conditions can be presented to the administrator.

For example, during the execution of the normal operation mode, the output control unit 75 causes the remote control 50a to display various information such as a set temperature.

During the execution of the arousal control mode, the output control unit 75 causes a display of the remote control 50a to display information indicating that the arousal control mode is ongoing.

(3) Normal Operation Mode

The following describes the normal operation mode.

The normal operation mode includes a cooling operation mode, a dehumidifying operation mode, and a heating operation mode.

The controller 70 determines and executes the cooling operation mode, the dehumidifying operation mode, or the heating operation mode in accordance with an instruction accepted from the remote control 50a or the like.

(3-1) Cooling Operation Mode

In the air conditioning apparatus 100, in the cooling operation mode, the connection state of the four-way switching valve 22 is set to the cooling-operation connection state in which the suction side of the compressor 21 and the gas-side shutoff valve 30 are connected to each other while the discharge side of the compressor 21 and the outdoor heat exchanger 23 are connected to each other. The refrigerant with which the refrigerant circuit 10 is filled is mainly circulated through the compressor 21, the outdoor heat exchanger 23, the outdoor expansion valve 24, the indoor expansion valve 54, and the indoor heat exchanger 52 in this order.

More specifically, when the cooling operation mode is started, in the refrigerant circuit 10, the refrigerant is sucked into the compressor 21, compressed, and then discharged. A low pressure in the refrigeration cycle corresponds to a suction pressure detected by the suction pressure sensor 36, and a high pressure in the refrigeration cycle corresponds to a discharge pressure detected by the discharge pressure sensor 37.

In the compressor 21, capacity control is performed in accordance with the cooling load required for the indoor unit 50. Specifically, the target value of the suction pressure is set in accordance with the cooling load required for the indoor unit 50, and the operating frequency of the compressor 21 is controlled so that the suction pressure becomes equal to the target value.

The gas refrigerant discharged from the compressor 21 passes through the discharge pipe 31 and the four-way switching valve 22 and flows into the gas-side end of the outdoor heat exchanger 23.

The gas refrigerant that has flowed into the gas-side end of the outdoor heat exchanger 23 releases heat and condenses into a liquid refrigerant in the outdoor heat exchanger 23 by exchanging heat with outdoor-side air supplied by the outdoor fan 25. The liquid refrigerant flows out of the liquid-side end of the outdoor heat exchanger 23.

The liquid refrigerant that has flowed out of the liquid-side end of the outdoor heat exchanger 23 passes through the outdoor liquid-side pipe 32, the outdoor expansion valve 24, the liquid-side shutoff valve 29, and the liquid-refrigerant connection pipe 6 and flows into the indoor unit 50. In the cooling operation mode, the outdoor expansion valve 24 is controlled to be fully open.

The refrigerant that has flowed into the indoor unit 50 passes through a portion of the indoor liquid refrigerant pipe 58 and flows into the indoor expansion valve 54. The refrigerant that has flowed into the indoor expansion valve 54 is decompressed by the indoor expansion valve 54 until the refrigerant becomes low-pressure refrigerant in the refrigeration cycle, and then flows into the liquid-side end of the indoor heat exchanger 52. In the cooling operation mode, the valve opening degree of the indoor expansion valve 54 is controlled such that the degree of superheating of refrigerant to be sucked into the compressor 21 becomes equal to a predetermined degree of superheating. The degree of superheating of refrigerant to be sucked into the compressor 21 is calculated by the controller 70 by using the temperature detected by the suction temperature sensor 35 and the pressure detected by the suction pressure sensor 36. The refrigerant that has flowed into the liquid-side end of the indoor heat exchanger 52 evaporates into a gas refrigerant in the indoor heat exchanger 52 by exchanging heat with indoor air supplied by the indoor fan 53. The gas refrigerant flows out of the gas-side end of the indoor heat exchanger 52. The gas refrigerant that has flowed out of the gas-side end of the indoor heat exchanger 52 flows to the gas-refrigerant connection pipe 7 through the indoor gas refrigerant pipe 59.

In this way, the refrigerant flowing through the gas-refrigerant connection pipe 7 passes through the gas-side shutoff valve 30, the outdoor gas-side pipe 33, the four-way switching valve 22, and the suction pipe 34 and is again sucked into the compressor 21.

(3-2) Dehumidifying Operation Mode

The dehumidifying operation mode is the same as the cooling operation mode described above, except that the operation of the indoor fan 53 is stopped to limit the supply of indoor air to the indoor heat exchanger 52.

(3-3) Heating Operation Mode

In the air conditioning apparatus 100, in the heating operation mode, the connection state of the four-way switching valve 22 is set to the heating-operation connection state in which the suction side of the compressor 21 and the outdoor heat exchanger 23 are connected to each other while the discharge side of the compressor 21 and the gas-side shutoff valve 30 are connected to each other. The refrigerant with which the refrigerant circuit 10 is filled is mainly circulated through the compressor 21, the indoor heat exchanger 52, the indoor expansion valve 54, the outdoor expansion valve 24, and the outdoor heat exchanger 23 in this order.

More specifically, when the heating operation mode is started, in the refrigerant circuit 10, the refrigerant is sucked into the compressor 21, compressed, and then discharged. A low pressure in the refrigeration cycle corresponds to a suction pressure detected by the suction pressure sensor 36, and a high pressure in the refrigeration cycle corresponds to a discharge pressure detected by the discharge pressure sensor 37.

In the compressor 21, capacity control is performed in accordance with the heating load required for the indoor unit 50. Specifically, a target value of the discharge pressure is set in accordance with the heating load required for the indoor unit 50, and the operating frequency of the compressor 21 is controlled such that the discharge pressure becomes equal to the target value.

The gas refrigerant discharged from the compressor 21 flows through the discharge pipe 31, the four-way switching valve 22, the outdoor gas-side pipe 33, and the gas-refrigerant connection pipe 7, and then flows into the indoor unit 50 through the indoor gas refrigerant pipe 59.

The refrigerant that has flowed into the indoor unit 50 passes through the indoor gas refrigerant pipe 59 and flows into the gas-side end of the indoor heat exchanger 52. The refrigerant that has flowed into the gas-side end of the indoor heat exchanger 52 releases heat and condenses into a liquid refrigerant in the indoor heat exchanger 52 by exchanging heat with indoor air supplied by the indoor fan 53. The liquid refrigerant flows out of the liquid-side end of the indoor heat exchanger 52. The refrigerant that has flowed out of the liquid-side end of the indoor heat exchanger 52 flows to the liquid-refrigerant connection pipe 6 through the indoor liquid refrigerant pipe 58 and the indoor expansion valve 54. In the heating operation mode, the valve opening degree of the indoor expansion valve 54 is controlled to be fully open.

In this way, the refrigerant flowing through the liquid-refrigerant connection pipe 6 flows into the outdoor expansion valve 24 through the liquid-side shutoff valve 29 and the outdoor liquid-side pipe 32.

The refrigerant that has flowed into the outdoor expansion valve 24 is decompressed until the refrigerant becomes low-pressure refrigerant in the refrigeration cycle, and then flows into the liquid-side end of the outdoor heat exchanger 23. In the heating operation mode, the valve opening degree of the outdoor expansion valve 24 is controlled such that the degree of superheating of refrigerant to be sucked into the compressor 21 becomes equal to a predetermined degree of superheating.

The refrigerant that has flowed into the liquid-side end of the outdoor heat exchanger 23 evaporates into a gas refrigerant in the outdoor heat exchanger 23 by exchanging heat with outdoor air supplied by the outdoor fan 25. The gas refrigerant flows out of the gas-side end of the outdoor heat exchanger 23.

The refrigerant that has flowed out of the gas-side end of the outdoor heat exchanger 23 passes through the four-way switching valve 22 and the suction pipe 34 and is again sucked into the compressor 21.

(4) Processing in Arousal Control Mode

Figure 3:
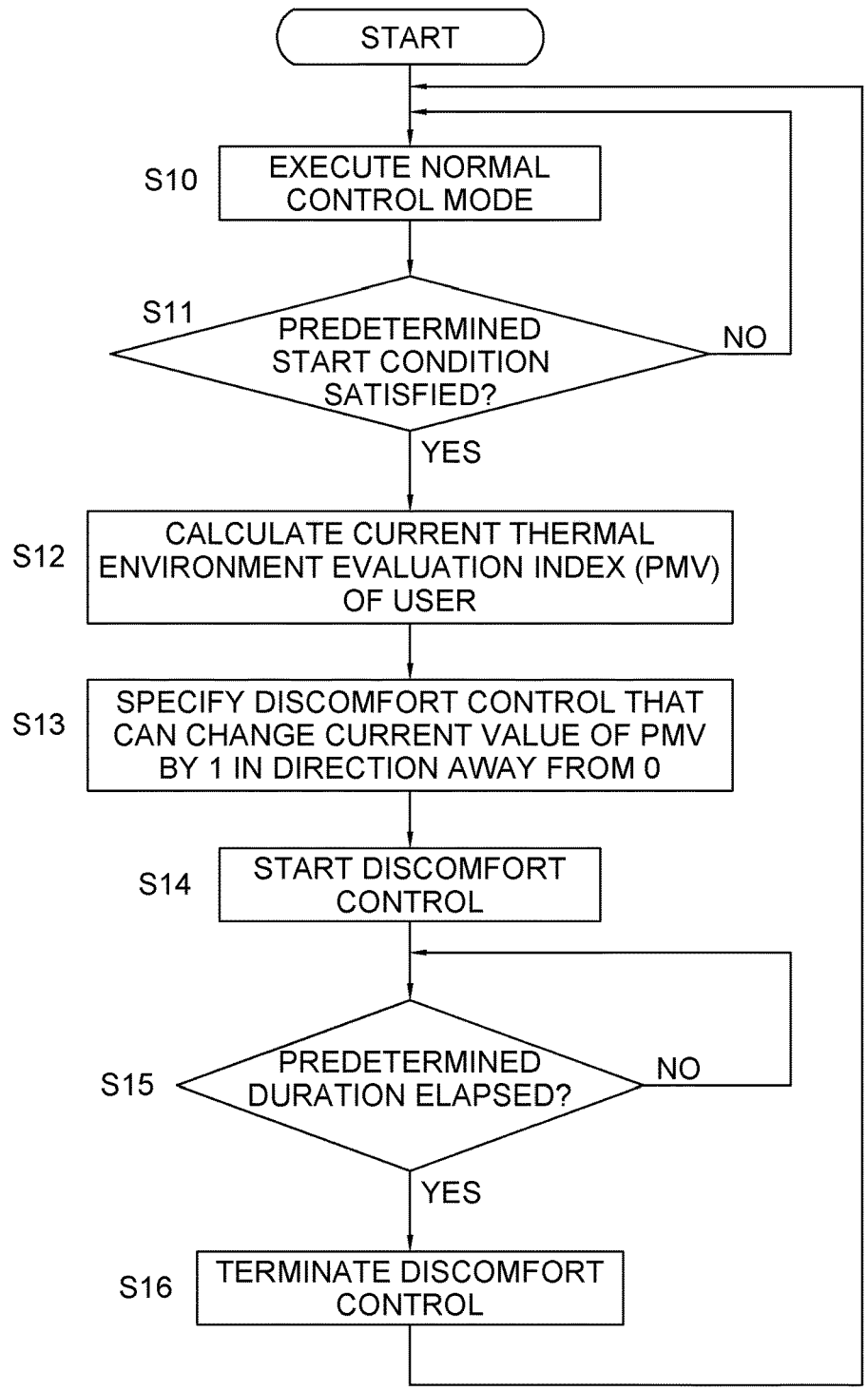
FIG. 3 is a control flowchart for an arousal control mode.

The following describes a processing flow in a case where the normal control mode is followed by the arousal control mode with reference to a flowchart illustrated in FIG. 3. Here, the processing flow from a state in which the normal control mode is executed will be exemplified.

A user present in the room is assumed to have completed the input of data of the amount of clothing that the user wears via the clothing amount acceptance unit 51a of the remote control 50a in advance, and the remote control 50a is assumed to know the amount of clothing that the user wears. It is also assumed that the user always holds a personal mobile terminal such as a mobile phone in a state in which the location position is identified through the GPS.

In step S10, the mode control unit 73 and the actuator control unit 74 execute the normal control mode. Specifically, the mode control unit 73 switches to the operation selected by the user via the remote control 50a among the cooling operation, the dehumidifying operation, and the heating operation, and the actuator control unit 74 controls the actuators such as the compressor 21 so that a set temperature set by the user can be implemented.

In step S11, the mode control unit 73 determines whether a predetermined start condition for starting the arousal control mode is satisfied. The predetermined start condition is not limited and may be, for example, a predetermined time of each day (such as about 13:30 around which people are likely to be in low-arousal-level state after lunch) or a time at which a predetermined time interval or more has elapsed since the last time discomfort control was terminated. If the predetermined start condition is satisfied, the process proceeds to step S12. If the predetermined start condition is not satisfied, step S10 is repeated.

In step S12, the mode control unit 73 calculates the current thermal environment evaluation index (PMV) of the user. Specifically, the mode control unit 73 reads the comfort equation 91 stored in the storage unit 71 and substitutes the values of six elements, namely, the indoor air temperature (value sensed by the indoor air temperature sensor 82), the radiation temperature at a location near the user (value sensed by the radiation temperature sensor 84), the relative humidity in the room (value sensed by the indoor humidity sensor 83), the wind velocity at the location near the user, the amount of clothing that the user wears (the amount of clothing accepted by the clothing amount acceptance unit 51a and thus grasped by the remote control 50a), and the metabolic rate of the user, into the comfort equation 91 to calculate the value of the thermal environment evaluation index (PMV) of the user.

The wind velocity at the location near the position of the user is calculated by the mode control unit 73 substituting the current control air flow rate of the indoor fan 53 into the wind velocity relational expression 92 stored in the storage unit 71. Since the metabolic information grasping unit 51b calculates the metabolic rate of the user from the distance traveled in the most recent predetermined unit time (for example, the most recent 10 minutes) in accordance with a predetermined relational expression, the mode control unit 73 reads the value of the metabolic rate of the user.

In the way described above, the mode control unit 73 substitutes the grasped values of the six elements into the comfort equation 91 to calculate the current value of the thermal environment evaluation index (PMV) of the user.

In step S13, the mode control unit 73 specifies a set temperature and/or set air flow rate for arousal that can change the thermal environment evaluation index (PMV) identified in step S12 by 1 in the direction away from 0. For example, the mode control unit 73 specifies, using the comfort equation 91, discomfort control having a new set temperature or set air flow rate that can change the thermal environment evaluation index (PMV) by 1 in the direction of discomfort by changing the set temperature in the room or the set air flow rate of the indoor fan 53 so as to make the user feel uncomfortable without changing the indoor humidity of the air conditioning apparatus 100.

In step S14, the actuator control unit 74 starts the discomfort control specified in step S13, and controls the actuators such as the compressor 21 so that the set temperature and the set humidity, which are newly set, can be implemented.

In step S15, the mode control unit 73 determines whether a predetermined duration has elapsed since the start of the discomfort control in step S14. The predetermined duration is not limited and is preferably 1 minute or more in view of making the user feel uncomfortable, preferably 2 minutes or more in view of sufficiently giving a discomfort feeling, and preferably 4 minutes or more in view of more reliably providing discomfort. It is preferable that the duration of the discomfort control not exceed 30 minutes in view of making the user less sensitive to a stimulus caused by an environment change and in view of the reduction of the effect of leading to arousal. If the predetermined duration has elapsed, the process proceeds to step S16. If the predetermined duration has not elapsed, the discomfort control is continuously performed until the predetermined duration has elapsed.

In step S16, the mode control unit 73 terminates the discomfort control. Then, the process returns to step S10, and the normal control is resumed to repeatedly perform the processing described above.

(5) Features of Embodiment (5-1)

The air conditioning apparatus 100 including the controller 70 according to this embodiment is subjected to discomfort control, separately from the normal control mode, so that the user can feel more uncomfortable than they currently do. The discomfort control causes a change in environment so that the value of the thermal environment evaluation index (PMV) of the user can be changed in a direction such that the user feels more uncomfortable than they currently do. Accordingly, for example, it may be possible to arouse a sleepy user. In this way, it is possible to increase the arousal level of the user by using a novel method of making the value of the thermal environment evaluation index (PMV) worse than the current value.

(5-2)

In this embodiment, the thermal environment evaluation index (PMV) is used as the index of discomfort control. Performing discomfort control that can worsen the value of the PMV of the user makes it possible to more reliably provide discomfort to the user and arouse the user.

(5-3)

In this embodiment, when the discomfort control is performed, the operation is performed such that the value of the PMV of the user is changed by 1 or more so as to provide discomfort. This makes it possible to more sufficiently provide discomfort to the user and arouse the user.

(5-4)

In this embodiment, the discomfort control is continuously performed for a predetermined duration or longer. This makes it possible to more reliably change the environment in the room where the user is present, provide discomfort to the user, and arouse the user.

(5-5)

In this embodiment, normal operation is performed to make the user comfortable, and discomfort control is performed only when a predetermined start condition is satisfied, thereby making it possible to arouse the user only under a specific condition.

(6) Modifications

In the embodiment described above, an example of embodiments of the present disclosure has been described; the embodiment described above is not intended to limit the content of the present disclosure in any way, and the present disclosure is not limited to the embodiment described above. The content of the present disclosure may be modified as appropriate without departing from the spirit of the present disclosure, and it is to be understood that such modifications also fall within the present disclosure.

In addition, the embodiment described above and a plurality of modifications described below may be combined as appropriate so as to maintain consistency between them.

(6-1) Modification A

In the embodiment described above, the process of performing discomfort control for making the user uncomfortable so that the arousal level of the user can be increased has been exemplified and described.

Figure 4:
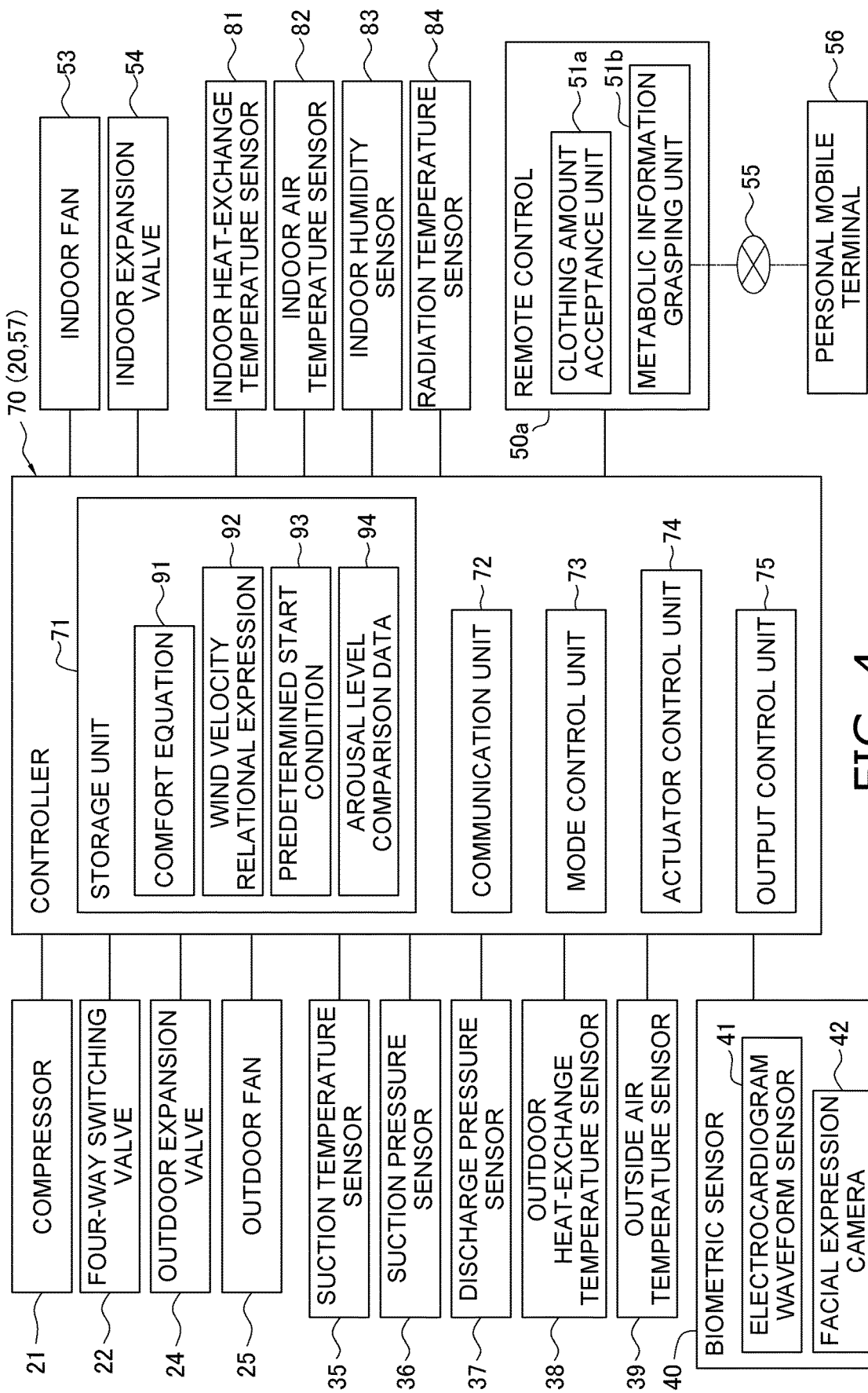
FIG. 4 is a block configuration diagram of an air conditioning apparatus according to modification A.

Alternatively, for example, as illustrated in FIG. 4, the discomfort control may be sufficiently performed until it is confirmed that the arousal level of the user is actually improved.

Specifically, the controller 70 according to this modification is communicably connected to a biometric sensor 40, and the storage unit 71 stores arousal level comparison data 94.

The biometric sensor 40 is a sensor for grasping the arousal level of the user and can be implemented using, for example, an electrocardiogram waveform sensor 41 that detects an electrocardiogram waveform of the user, and a facial expression camera 42 that detects the facial expression of the user. The electrocardiogram waveform sensor 41 is used by being attached to near the heart of the user and is capable of wirelessly transmitting detected electrocardiogram waveform data to the controller 70. The facial expression camera 42 is disposed at a specific position in a room where an image of the facial expression of the user can be captured, and is capable of wirelessly transmitting detected facial expression data to the controller 70.

The arousal level comparison data 94 stored in the storage unit 71 is data for estimating the arousal level of the user from the respective items of detection content of the electrocardiogram waveform sensor 41 and the facial expression camera 42, which serve as the biometric sensor 40, on the basis of the known relationship between the electrocardiogram waveform and the arousal level and the known relationship between the arousal level and the facial expression corresponding to a difference between a facial expression of the user and a predetermined reference facial expression. For example, the arousal level corresponding to the electrocardiogram waveform, which is grasped from the electrocardiogram waveform sensor 41, may be identified by referring to relationship data stored in advance between the electrocardiogram waveform and the arousal level and, in addition, corrected by a predetermined amount of arousal level correction corresponding to a difference between the facial expression grasped from the facial expression camera 42 and the predetermined reference facial expression to grasp the arousal level of the user.

Figure 5:
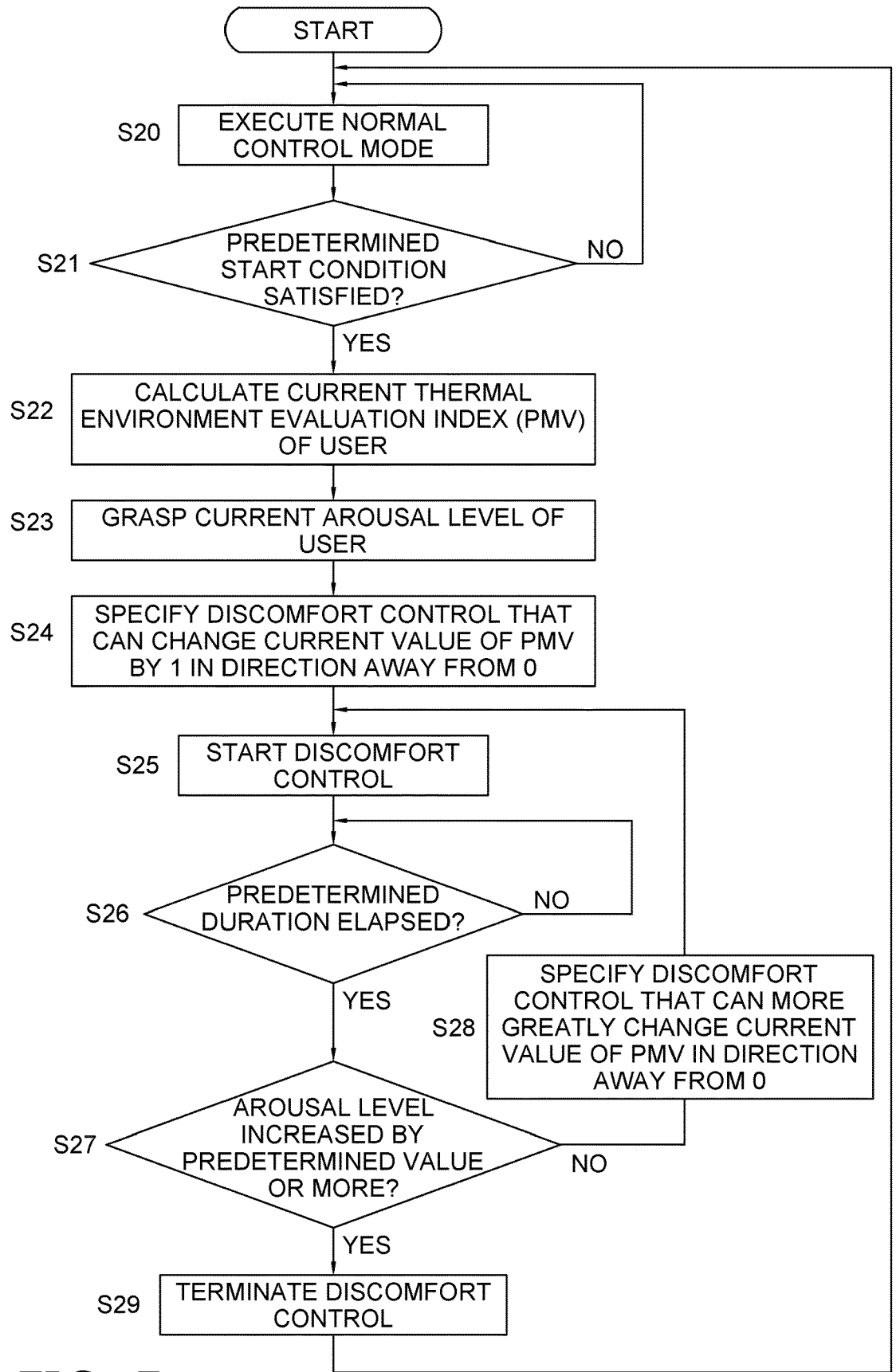
FIG. 5 is a control flowchart for an arousal control mode according to modification A.

When the configuration described above is used, for example, as illustrated in a flowchart in FIG. 5, the normal control mode may be followed by the arousal control mode.

As in the embodiment described above, a user present in the room is assumed to have completed the input of data of the amount of clothing that the user wears via the clothing amount acceptance unit 51a of the remote control 50a in advance, and the remote control 50a is assumed to know the amount of clothing that the user wears. It is also assumed that the user always holds a personal mobile terminal such as a mobile phone in a state in which the location position is identified through the GPS.

In step S20, as in the embodiment described above, the mode control unit 73 and the actuator control unit 74 execute the normal control mode.

In step S21, as in the embodiment described above, the mode control unit 73 determines whether a predetermined start condition for starting the arousal control mode is satisfied. If the predetermined start condition is satisfied, the process proceeds to step S22. If the predetermined start condition is not satisfied, step S20 is repeated.

In step S22, as in the embodiment described above, the mode control unit 73 calculates the current thermal environment evaluation index (PMV) of the user.

In step S23, the mode control unit 73 calculates the current estimated value of the arousal level of the user. Specifically, the current estimated value of the arousal level of the user is grasped from the respective detection results of the electrocardiogram waveform sensor 41 and the facial expression camera 42 in the biometric sensor 40 and the arousal level comparison data 94 stored in the storage unit 71.

In step S24, the mode control unit 73 specifies a discomfort control having a set temperature and/or a set air flow rate for arousal that can change the thermal environment evaluation index (PMV) identified in step S12 by 1 in the direction away from 0.

In step S25, the actuator control unit 74 starts the specified discomfort control and controls the actuators such as the compressor 21 so that the set temperature and the set humidity, which are newly set, can be implemented.

In step S26, the mode control unit 73 determines whether a predetermined duration has elapsed since the start of the discomfort control in step S25. If the predetermined duration has elapsed, the process proceeds to step S27. If the predetermined duration has not elapsed, the discomfort control is continuously performed until the predetermined duration has elapsed.

In step S27, the mode control unit 73 again grasps the estimated value of the arousal level of the user at this point in time, and determines whether the estimated value has increased by a predetermined value or more from the estimated value of the arousal level of the user grasped in step S23. If the estimated value has increased by the predetermined value or more, the process proceeds to step S29. If the estimated value has not increased by the predetermined value or more, the process proceeds to step S28.

In step S28, the mode control unit 73 specifies discomfort control that can more greatly change the value of the PMV of the user in the direction away from 0 than the most recently performed discomfort control, and then the process proceeds to step S25. In this way, repeating steps S25, S26, S27, and S28 makes it possible to reliably increase the estimated value of the arousal level of the user (i.e., the processing described above is repeatedly performed until it is determined in step S27 that the estimated value of the arousal level of the user has increased by the predetermined value or more).

In step S29, the mode control unit 73 terminates the discomfort control. Then, the process returns to step S20, and the normal control is resumed to repeatedly perform the processing described above.

According to the process described above, the discomfort control makes it possible to more reliably improve the arousal level of the user.

(6-2) Modification B

In the embodiment described above, a predetermined start condition for starting the discomfort control has been exemplified and described in which a predetermined time is reached or a predetermined time interval or more has elapsed since the last time discomfort control was terminated.

Figure 6:
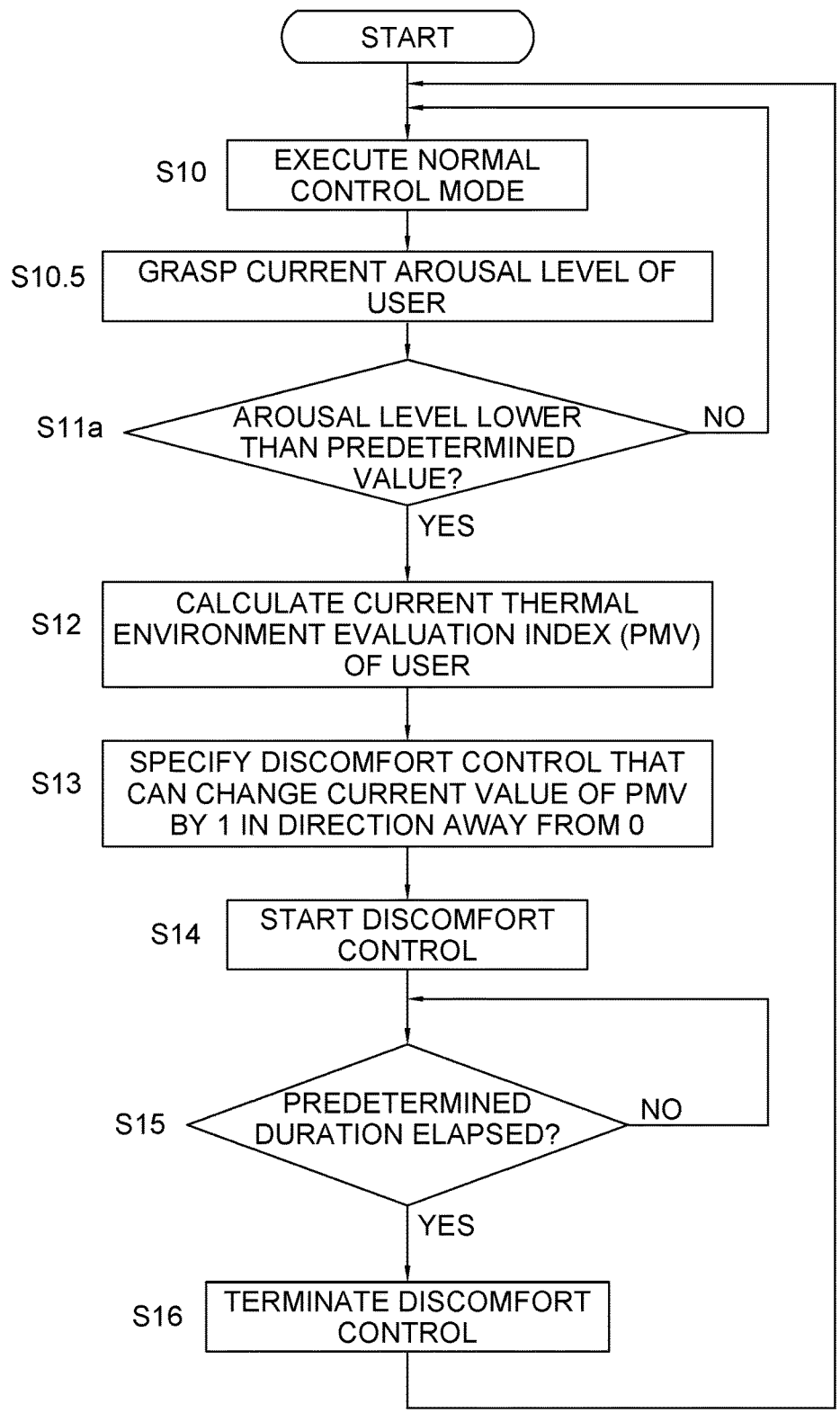
FIG. 6 is a control flowchart for an arousal control mode according to modification B.

The predetermined start condition for starting the discomfort control is not limited to this. For example, as illustrated in FIG. 6, the processing of step S11 in the embodiment described above may be changed to processing (step S11a) of determining whether the arousal level of the subject has a value lower than a predetermined value during the execution of the normal control mode. In this case, step S11a described above is performed after the current arousal level of the user is grasped (step S10.5) while the normal control mode is executed. If the arousal level of the subject becomes lower than the predetermined value, the process may proceed to step S12, and the discomfort control may be performed without any change.

Alternatively, in place of the condition that the arousal level of the subject becomes lower than the predetermined value, a condition that the decrease in the arousal level of the subject per unit time is larger than a predetermined value may be used as the condition for proceeding to step S12.

The control described above makes it possible to perform discomfort control only when the arousal level of the subject decreases while the normal control mode is executed. Accordingly, it is possible to prevent the discomfort control from being performed even though the subject is in a sufficiently aroused state.

(6-3) Modification C

Also in modification A described above, as in the embodiment described above, a predetermined start condition for starting the discomfort control has been exemplified and described in which a predetermined time of day is reached or a predetermined time interval or more has elapsed since the last time discomfort control was terminated.

Figure 7:
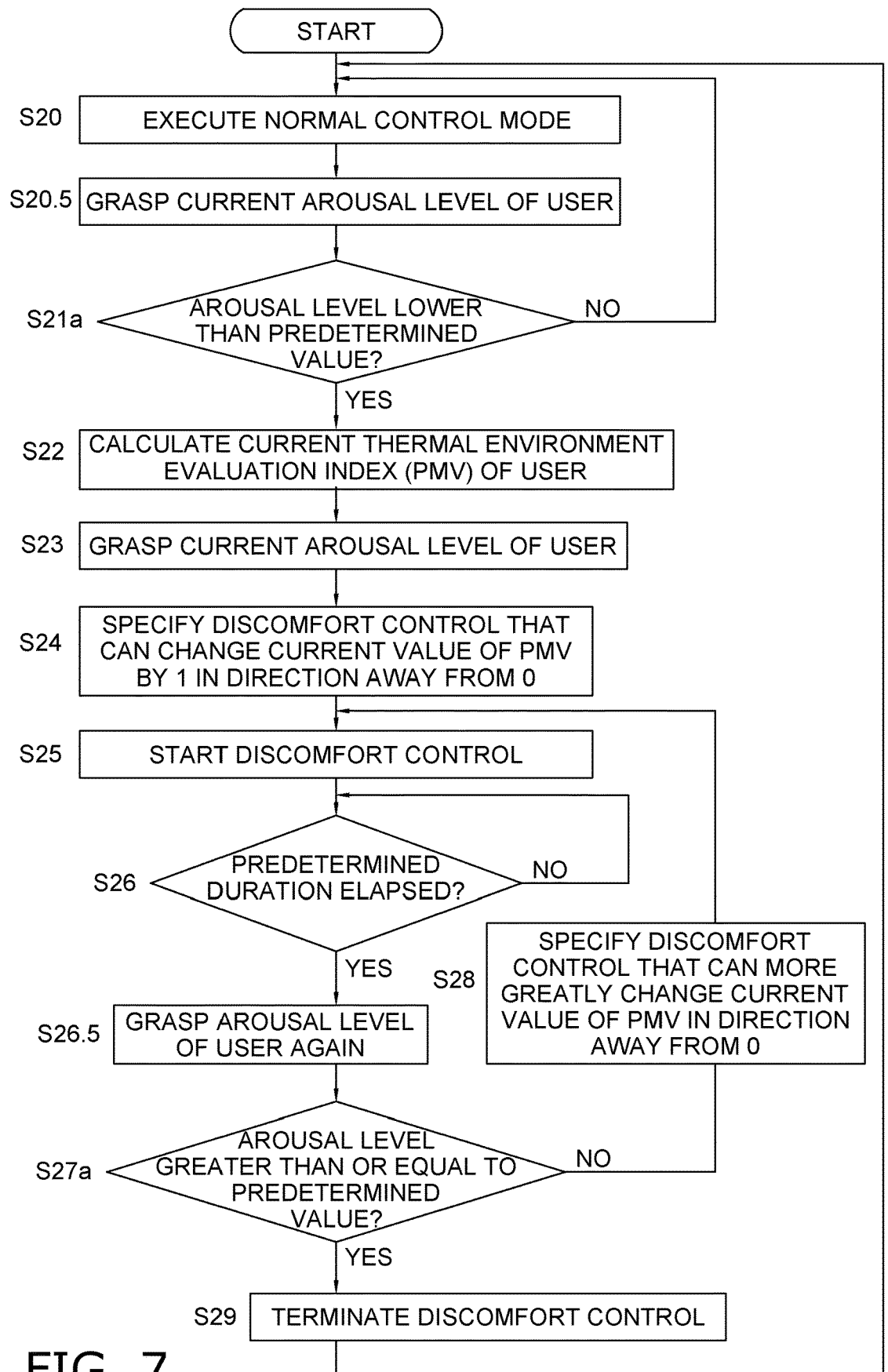
FIG. 7 is a control flowchart for an arousal control mode according to modification C.

Also in the processing according to modification A, the predetermined start condition for starting the discomfort control is not limited to this. For example, as illustrated in FIG. 7, the processing of step S21 according to modification A described above may be changed to processing (step S21a) of determining whether the arousal level of the subject has a value lower than a predetermined value during the execution of the normal control mode. In this case, step S21a described above is performed after the current arousal level of the user is grasped (step S20.5) while the normal control mode is executed. If the arousal level of the subject becomes lower than the predetermined value, the process may proceed to step S22, and the discomfort control may be performed without any change. In addition, the current value of the arousal level of the user, which has been changed by the discomfort control performed in step S25, may be again grasped (step S26.5), it may be checked whether the changed arousal level of the user is greater than or equal to a predetermined value (step S27a), and the discomfort control may be terminated.

Alternatively, in place of the condition that the arousal level of the subject becomes lower than the predetermined value, a condition that the decrease in the arousal level of the subject per unit time is larger than a predetermined value may be used as the condition for proceeding to step S22.

The control described above makes it possible to perform discomfort control only when the arousal level of the subject decreases while the normal control mode is executed. Accordingly, it is possible to prevent the discomfort control from being performed even though the subject is in a sufficiently aroused state.

(6-4) Modification D

In the embodiment described above, discomfort control performed by grasping the current value of the PMV of the user and determining the target control value of the air conditioning apparatus 100 so that the value of the PMV becomes equal to a value expected to make the user feel more uncomfortable has been exemplified and described.

Figure 8:
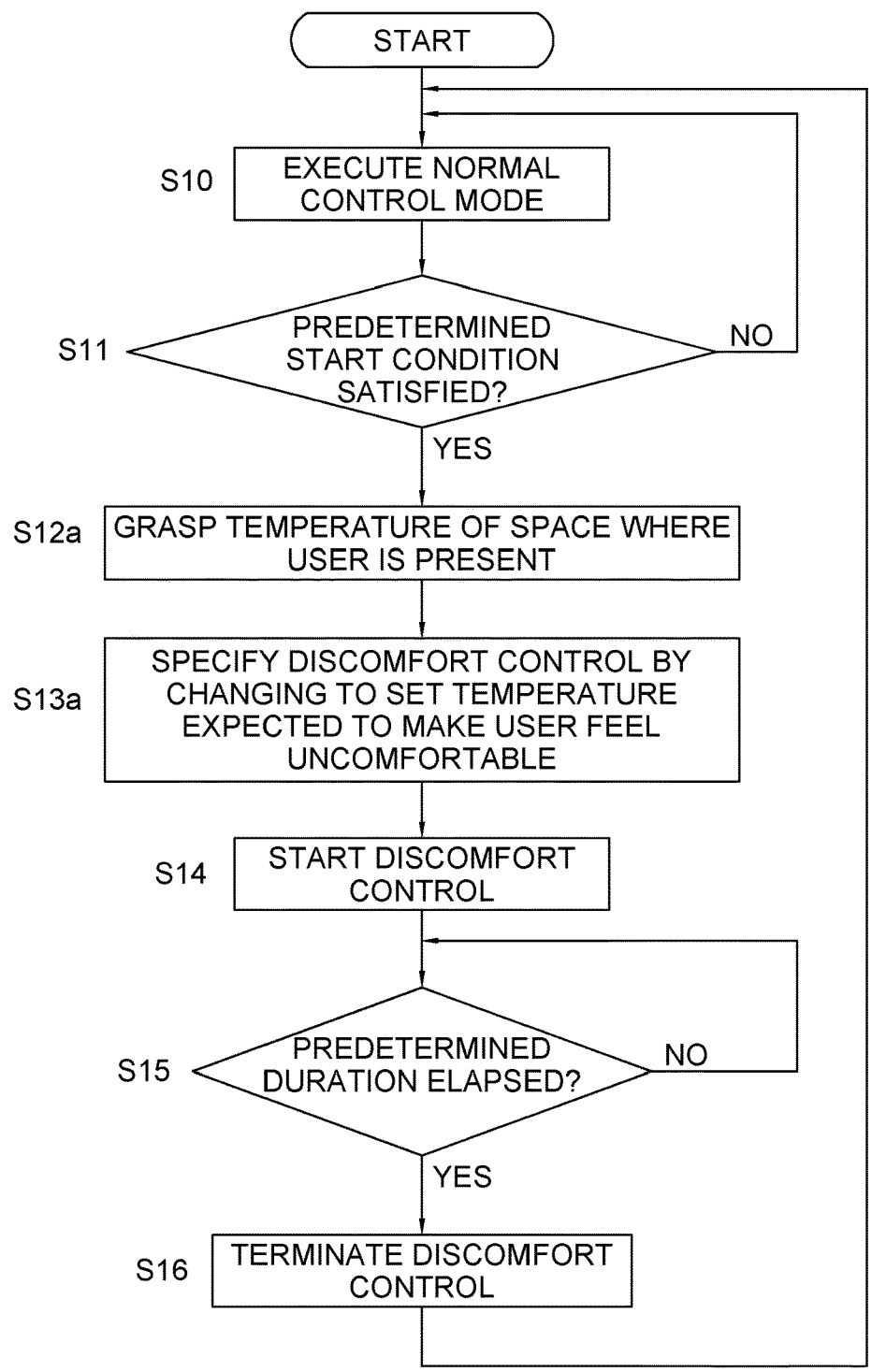
FIG. 8 is a control flowchart for an arousal control mode according to modification D.

Alternatively, for example, as illustrated in FIG. 8, the temperature of the room where the user is present may be grasped as a comfort-related value (step S12a), the set temperature of the air conditioning apparatus 100 may be determined so that the temperature of the room becomes equal to a value expected to make the user feel more uncomfortable to specify discomfort control (step S13a), and the specified discomfort control may be performed. The method for determining the set temperature for the discomfort control described above is not limited. For example, when the cooling operation is being performed in the normal control mode, the set temperature may be set to a temperature higher than the current temperature in the room by a predetermined temperature or more, and when the heating operation is being performed in the normal control mode, the set temperature may be set to a temperature lower than the current temperature in the room by a predetermined temperature or more. Alternatively, a discomfort temperature expected to make the user feel uncomfortable regardless of the type of the normal control mode may be stored in a memory in advance, and discomfort control may be specified so that the discomfort temperature is set as the target value.

The comfort-related value is not limited to the PMV or the temperature, and the humidity of the room where the user is present, the wind velocity of conditioned air delivered to the user from the air conditioning apparatus 100, the radiation in the room where the user is present, the discomfort index of the user, or the like may be used as the comfort-related value.

(6-5) Modification E

In the embodiment described above, the case where discomfort control that can change the value of the PMV of the user in the direction away from 0 is specified has been exemplified and described.

However, a case where the PMV of the user is changed to provide discomfort to the user is not limited to the case where the value of the PMV is changed in the direction away from 0. Alternatively, the value of the PMV may be changed across 0. In this case, the value of the PMV may be changed so that the absolute value of the PMV becomes larger than the current value while the value of the PMV is changed across 0.

(6-6) Modification F

In the embodiment described above, a case has been exemplified and described in which discomfort control is specified and executed such that the target value is set to the set temperature and/or set air flow rate for arousal that can change the current thermal environment evaluation index (PMV) by 1 in the direction away from 0.

Alternatively, the index used for the discomfort control is not limited to the thermal environment evaluation index (PMV). For example, the discomfort index of the subject may be used as the index, or the degree of deviation of the temperature of the target space from the set temperature may be used as the index.

The discomfort index can be obtained by calculating $0.81 T + 0.01 H (0.99 T - 1.43) + 46.3$, where $T$ (° C.) denotes the dry-bulb temperature (temperature of air) and $H$ (%) denotes the relative humidity. When the discomfort control is performed using the discomfort index as the index, the current discomfort index may be obtained, and control may be performed such that the target value is set to a set temperature or set humidity that makes the discomfort index greater than the current value.

When the discomfort control is performed using the degree of deviation of the temperature of the target space from the set temperature as the index, the current degree of deviation may be obtained, and control may be performed such that the target value is set to a set temperature that makes the deviation greater than the current value of the degree of deviation.

(6-7) Modification G

The embodiment described above may be applied to a case where a plurality of users are present in a room, a personal air conditioning means is provided for each individual, and each personal air conditioning means is controlled to provide discomfort to a corresponding one of the users.

EXAMPLES

A temporal change in the arousal level of the subject was measured when a specific initial thermal environment for a target space where the subject was present was changed to a thermal environment different from the initial thermal environment.

In the initial thermal environment, the air temperature was 27.3° C., the wall surface temperature was 27.3° C., the relative humidity was 31.6%, the average wind velocity was 0.1 m/s, the amount of clothing was 0.3 clo (short-sleeve shirt and short pants), and the metabolic rate was 1.1 met. The calculated value of the thermal environment evaluation index (PMV) in the initial thermal environment was 0.13.

In contrast, in the thermal environment changed from the initial thermal environment, the air temperature was 21.6° C., the wall surface temperature was 27.3° C., the relative humidity was 31.6%, the average wind velocity was 0.3 m/s, the amount of clothing was 0.3 do (short-sleeve shirt and short pants), and the metabolic rate was 1.1 met. The calculated value of the thermal environment evaluation index (PMV) in this thermal environment was −2.02.

The subject was a person who had been in the initial thermal environment for 30 minutes or longer in advance and therefore accustomed to the environment.

The discomfort control for changing the thermal environment was performed aiming that the air temperature would reach 21.6° C., and it took 15 seconds for an air temperature of 27.3° C. to reach an air temperature of 21.6° C. (the air blow was directed toward the subject to rapidly decrease the temperature).

Then, the temporal change in the arousal level of the subject was measured from the point in time at which the discomfort control was started.

The arousal level of the subject was defined as the inverted value of the sleepiness evaluation value of the subject. That is, evaluation was made such that the larger the sleepiness evaluation value, the lower the arousal level, and the lower the sleepiness evaluation value, the higher the arousal level. Specifically, the arousal level was evaluated as 1 when the sleepiness evaluation value was 5, the arousal level was evaluated as 2 when the sleepiness evaluation value was 4, the arousal level was evaluated as 3 when the sleepiness evaluation value was 3, the arousal level was evaluated as 4 when the sleepiness evaluation value was 2, and the arousal level was evaluated as 5 when the sleepiness evaluation value was 1.

The sleepiness evaluation value was obtained by performing evaluation in accordance with the following five-grade criteria by a trained evaluator observing the subject.

1: Not at all sleepy (Rapid and frequent eye movements Blinking in stable cycles. Active movements along with body movements.)
2: Slightly sleepy (Slow eye movements. Lips open.)
3: Sleepy (Slow and frequent blinking. Mouth movements. Corrected sitting positions. Hands on face.)
4: Fairly sleepy (Blinking that seems to be conscious. Unnecessary body movements such as shaking the head and moving the shoulders up and down. Frequent yawning, and observed deep breathing. Slow blinking and slow eye movements.)
5 Very sleepy (Eyes closed. Head tilted downwards. Head rolled back.)

Figure 9:
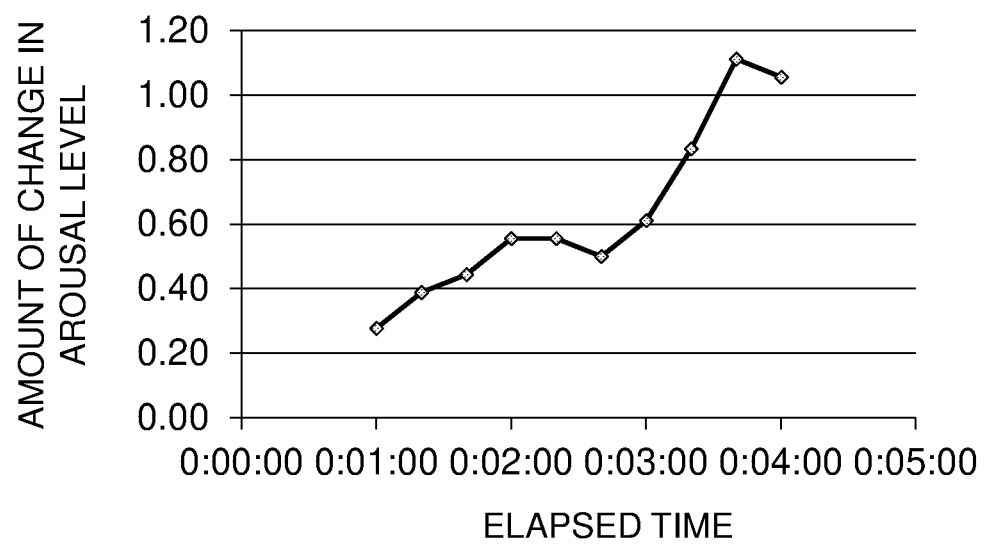
FIG. 9 is a graph illustrating a temporal change in the arousal level of the subject.

A temporal change in the arousal level of the subject based on the above is illustrated in a graph in FIG. 9.

According to the results illustrated in FIG. 9, in the environment where the PMV was −2.02, compared to the environment where the PMV was 0.13, the increase in the arousal level of the subject for a duration of 1 minute was 0.28, the increase at the elapse of 2 minutes was 0.56, the increase at the elapse of 3 minutes was 0.61, and the increase at the elapse of 4 minutes was 1.06. After the elapse of 4 minutes, a decrease in the arousal level was observed.

While an embodiment of the present disclosure has been described, it will be understood that forms and details can be changed in various ways without departing from the spirit and scope of the present disclosure as recited in the claims.

What is claimed is:

1. An air conditioning control device for controlling an air conditioning apparatus capable of changing an air environment of a target space, the air conditioning control device comprising:
   a first sensor sensing a value used for calculating a PMV, the PMV being a thermal environment evaluation index;
   a second sensor sending a value used for calculating an arousal level of the subject; and
   an electronic controller including a CPU,
   the CPU being configured to calculate the PMV of a subject based on the value sensed by the first sensor,
   the CPU being further configured to calculate the arousal level of the subject based on the value sensed by the second sensor,
   the CPU being further configured to execute a normal control mode in which the air conditioning apparatus is controlled so that a set temperature condition of the target space is satisfied,
   the CPU being further configured to start an arousal control mode in a case in which the arousal level of the subject is below a predetermined value while the normal control mode is being executed, and
   the CPU being further configured to execute the arousal control mode in which the air conditioning apparatus is controlled, so that an absolute value of the PMV of the subject increases by more than 1 from a current absolute value of a current PMV by changing the PMV of the subject from the current PMV in a direction away from 0.

2. The air conditioning control device according to claim 1, wherein
   the PMV is grasped from at least a temperature and a humidity in the target space.

3. The air conditioning control device according to claim 1, wherein
   the CPU is further configured to continue control of the air conditioning apparatus for 4 minutes or more to increase the absolute value of the MEV of the subject so that the absolute value of the PMV of the subject is larger than the current value by 2 or more.

4. The air conditioning control device according to claim 1, wherein
the CPU is further configured to continue control for at least 1 minute or more, the control being based on the PMV.

5. The air conditioning control device according to claim 4, wherein
the CPU is further configured to set a duration of control to 30 minutes or less, the control being based on the MIN.

6. The air conditioning control device according to claim 1, wherein
the CPU is further configured to set a duration of control to 30 minutes or less, the control being based on the PMV.

7. An air conditioning apparatus including the air conditioning control device according to claim 1.

* * * * *